(12) United States Patent
Dey et al.

(10) Patent No.: US 11,247,595 B2
(45) Date of Patent: Feb. 15, 2022

(54) LATCHING DEVICE

(71) Applicant: Kiekert AG, Heiligenhaus (DE)

(72) Inventors: John Dey, Wixom, MI (US); Pat Mullins, Canton, MI (US); Jim Zhuang, Canton, MI (US)

(73) Assignee: Kiekert AG, Heiligenhaus (DE)

( * ) Notice: Subject to any disclaimer, the term of this patent is extended or adjusted under 35 U.S.C. 154(b) by 585 days.

(21) Appl. No.: 16/301,198

(22) PCT Filed: May 12, 2017

(86) PCT No.: PCT/IB2017/000561
§ 371 (c)(1),
(2) Date: Nov. 13, 2018

(87) PCT Pub. No.: WO2017/195023
PCT Pub. Date: Nov. 16, 2017

(65) Prior Publication Data
US 2019/0143868 A1 May 16, 2019

Related U.S. Application Data

(60) Provisional application No. 62/336,117, filed on May 13, 2016.

(51) Int. Cl.
*B60N 2/90* (2018.01)
*E05B 81/14* (2014.01)
(Continued)

(52) U.S. Cl.
CPC ........... *B60N 2/933* (2018.02); *B60N 2/0232* (2013.01); *B60N 2/3004* (2013.01); *B60N 2/366* (2013.01);
(Continued)

(58) Field of Classification Search
CPC .............. B60N 2/933; B60N 2002/952; B60N 2002/924; B60N 2/3004; B60N 2/366; B60N 2/0232; E05B 81/14; E05B 81/06
See application file for complete search history.

(56) References Cited

U.S. PATENT DOCUMENTS 7,500,700 B2 * 3/2009 Kunst ..................... E05B 81/14
292/201
10,947,759 B2 * 3/2021 Mazal ..................... E05B 81/54

FOREIGN PATENT DOCUMENTS

DE 102008028255 12/2009
WO 99/00572 1/1999
(Continued)

OTHER PUBLICATIONS

International Search Report and Written Opinion for corresponding Patent Application No. PCT/IB2017/000561 dated Aug. 10, 2017.

*Primary Examiner* — Milton Nelson, Jr.
(74) *Attorney, Agent, or Firm* — Renner, Otto, Boisselle & Sklar, LLP

(57) ABSTRACT

A latching device for automotive applications, in particular a backrest latch for the bolting and unbolting of seat backrests in motor vehicles, with a locking mechanism fundamentally comprising a catch and at least one pawl, and with a manually and/or mechanically impingeable unbolting element for the locking mechanism, wherein the unbolting element is a component of an exchangeable unbolting module which defines a latch casing together with a basic module incorporating the locking mechanism is proposed. A latching device where only the unbolting module is adapted to the specific purpose of use is provided, considerably reducing manufacturing, installation and warehousing costs.

13 Claims, 6 Drawing Sheets

(51) Int. Cl.
*B60N 2/02* (2006.01)
*E05B 81/06* (2014.01)
*B60N 2/36* (2006.01)
*B60N 2/30* (2006.01)
*E05B 81/34* (2014.01)

(52) U.S. Cl.
CPC .............. *E05B 81/06* (2013.01); *E05B 81/14* (2013.01); *E05B 81/34* (2013.01); *B60N 2002/924* (2018.02); *B60N 2002/952* (2018.02)

(56) References Cited

FOREIGN PATENT DOCUMENTS

| | | |
|---|---|---|
| WO | 2005/012676 | 2/2005 |
| WO | 2009/149684 | 12/2009 |
| WO | 2009/149685 | 12/2009 |

\* cited by examiner

LATCHING DEVICE

TECHNICAL FIELD

The invention relates to a latching device for automotive applications, in particular a backrest latch for the bolting and unbolting of seat backrests in motor vehicles, with a locking mechanism fundamentally comprising a catch and at least a pawl, and with an unbolting element for the locking mechanism which can be impinged manually and/or mechanically.

BACKGROUND OF THE INVENTION

Latching devices for automotive applications and in particular backrest latches for the bolting and unbolting of seat backrests in motor vehicles have become known by means of WO 2009/149684 A1 or DE 10 2008 028 255 A1, for example. Two pawls are regularly used for the locking mechanisms used there. The first pawl assumes the actual and original latching function, therefore functions as a latching pawl so to speak, while the other second locking pawl functions as a blocking or a securing pawl. The function of the blocking pawl is to increase security and prevent unintentional opening.

In order to unbolt the known and largely class-specific latching devices for example for the WO 2009/149684 A1 of the applicant it is proceeded in such a way that a motorized actuator works on a triggering lever in such a way that the triggering lever in question interacts with the two aforementioned pawls consecutively during its movement. The actuator therefore functions as an unbolting element in conjunction with the triggering lever where applicable.

Manual unbolting is predominantly known in practice in addition to such motorized unbolting in backrest latches so to speak. The procedure usually takes place in such a way that a Bowden cable is impinged which either directly impinges a triggering lever or the pawl. Consequently, hereafter the locking mechanism and consequently the closure device are opened.

The previously described concepts of manual or also motorized unbolting of such backrest latches have been tried and tested. In fact, they enable motor vehicles equipped therewith to have variable uses. Because such backrest latches are usually used to give the motor vehicle interior as flexible a design as possible. To this end, one or several folding seat backrests are equipped with the relevant backrest latch. The backrest latch and consequently the pertaining seat backrest can be unbolted and folded over using a manual or motorized unbolting device. The passenger interior can thus be optionally transformed into a transportation space or a passenger transportation space. Hybrid forms are also conceivable.

The individual backrest latches on the one hand for the manual unbolting and on the other hand for the motorized unbolting are of different structural constructions. Thus, backrest latches with manual unbolting are characterized by a low number of components, especially as only a Bowden cable needs to be connected here. In contrast, backrest latches with motorized unbolting are of a relatively complex design, especially as a motorized drive unit needs to be incorporated here and must ensure the relevant unbolting. As a consequence hereof, different variants are conceived, constructed and implemented from a manufacturing viewpoint. This takes a great deal of manufacturing effort. This is where the invention wishes to provide assistance.

SUMMARY OF THE INVENTION

The invention is based on the technical problem of further developing such a latching device for automotive applications and in particular a backrest latch for the bolting and unbolting of seat backrests in motor vehicles in such a way that the manufacturing effort is considerably reduced. In addition, advantages should be observed in the design.

In order to solve this technical problem a class-specific latching device for automotive applications within the scope of the invention is characterized in that the unbolting element is a component of an exchangeable unbolting module which defines a latch casing together with a basic module incorporating the locking mechanism.

Within the scope of the invention a latch casing is therefore initially provided for the latching device. This latch casing is divided into two parts in accordance with the invention, namely comprising the basic module and the unbolting module. The basic module generally incorporates the locking mechanism. In contrast, the unbolting element is located in the unbolting module.

Due to the fact that the unbolting module and the basic module are connected in an advantageous detachable manner, one and the same basic module can be combined and connected with different unbolting modules where necessary. It is therefore conceivable that the concurring basic module on the one hand is connected to a mechanical unbolting module and on the other hand to a motorized unbolting module. The mechanical unbolting module demonstrates a manually impingeable unbolting element. In contrast, the motorized unbolting module is equipped with a motorized impingeable unbolting element. For this purpose, the motorized unbolting module demonstrates the unbolting element and a drive unit for the motorized impingeable unbolting element. The respective unbolting module and the basic module are generally connected via a detachable plug connection, a screw connection, etc.

The unbolting module primarily incorporates the unbolting element, while the basic module typically incorporates the locking mechanism in its interior and houses it. Thus, the latching device in accordance with the invention or the corresponding backrest latch for activation of the locking mechanism can be variably laid out in a very different manner. Thus, the manually impingeable unbolting element can be directly mechanically impinged via a lever, for example.

If such activation is desired, the latching device will be constructed in such a way that the relevant mechanical unbolting module and the basic module are connected.

However, it is alternatively or additionally possible to provide for motorized impingement of the unbolting element. In this case, the motorized unbolting module will be connected to the basic module. In principle, of course, combinations are also conceivable, i.e. an unbolting module which enables and permits both manual and motorized impingement of the unbolting element. If a double functionality is desired so to speak, the manual and motorized unbolting module is detachably connected to the basic module in turn.

In all of these cases, the basic module remains unchanged and only the unbolting module is adapted to the specific purpose of use. This considerably reduces manufacturing costs. The same also applies to installation and warehousing. Because all cases of use can be covered with one and the same basic module.

Furthermore, the unbolting element can be activated remotely, for example via a Bowden cable and a pull strap for the manual variant. An impingement of the relevant Bowden cable with a lever or electrically with the aid of a drive motor is just as conceivable and is encompassed by the invention. Furthermore, an electrical remote control of the motorized unbolting element and consequently the motorized unbolting module is conceivable and is explicitly encompassed. All of these variants can be easily executed with retention of the basic module by the desired unbolting module being combined with the basic module on the latch housing according to the design of the unbolting device.

For manufacturing and installation reasons, an execution form has proven beneficial in which the unbolting module can be connected to the basic module on the head side. Because the basic module is typically set up and designed to incorporate the locking mechanism. Any interfaces between the locking mechanism on the one hand and the unbolting element on the other hand are respectively provided for on the head side of the basic module or on the base of the unbolting module. Consequently, in the case of connection of the unbolting module to the head side of the basic module the desired mechanical connection and functionality is guaranteed.

Thus, a latching device for automotive applications and in particular a backrest latch for the bolting and unbolting of seat backrests in motor vehicles is provided which enables a flexible and cost-effective design and is also characterized by simple manufacture and warehousing. Particular cost advantages are thus observed compared to the state of the art. These are the crucial advantages.

According to an advantageous design, the mechanically impingeable unbolting element is equipped with at least one electromotor and an output element which interacts with the unbolting element. The at least one electromotor and the output element are designed as components of the drive unit or motorized drive unit. In addition to the electromotor and the output element the mechanical drive unit usually has at least one additional gear shaft. The design is generally such that the output element interacts with the unbolting element. Movements of the output element initiated by the electromotor are therefore transferred to the unbolting element. Consequently, it is typically transferred from its "bolted" functional position to its "unbolted" functional position. Generally, in this case the electromotor also tends to ensure that the output element returns to its "bolted" position thereafter. The same applies to the drive unit overall.

Thus, it is possible that the latching device in question or the pertaining locking mechanism cannot only be unbolted mechanically with the aid of the drive unit, but manual unbolting is also possible independently thereof. Because as soon as, for example, the backrest latch is transferred to its latching position, the unbolting element is in its bolted position. The unbolting can now optionally take place with the aid of the electromotor or, for example, a manual handle. This is possible because in both cases the output element engages or has engages into its "bolted" position.

In order to impinge the unbolting element with the aid of the electromotor, the output element driven by the electromotor typically possesses a cam impinging the unbolting element. The cam usually protrudes from the output element and can thus interact with the unbolting element.

As the unbolting element and the output element are usually located on the same axis, an especially simple adjustment of the unbolting element can thus be achieved with the aid of the electromotor. Because, to this end, it is only necessary for the output element driven by the electromotor to travel against a stop of the unbolting element with its cam and to propel the unbolting element located on the same axis with its further movement in this direction. At the end of this movement this unbolting element is located in its "unbolted" position. The same applies to the locking mechanism. Consequently, the pawl is lifted from the catch.

As the catch is generally impinged into its opening position with the aid of the spring, a previously trapped locking bolt is freed.

For the drive of the output disc, the invention utilizes the gear shaft already mentioned as a component of the drive unit. The gear shaft is preferably a double gear shaft. In fact, the gear shaft is meshed on the one hand with an output shaft of the electromotor and on the other hand with the aforementioned output element. Different translations can be worked with in each instance, on the one hand between the output shaft of the electromotor and the gear shaft and on the other hand between the gear shaft and the output element. The name double gear shaft is thus clarified.

The gear shaft and the output element are generally pivotable around parallel axes for reasons of compact construction. Usually both axes are aligned parallel to one another for the gear shaft on the one hand and the output element on the other hand and are arranged at a distance from one another. Furthermore, a design is recommended in such a way that the axis of the gear shaft and consequently the gear shaft is arranged above an axis of the output element. Thus, construction space is available below the gear shaft. This construction space is advantageously filled by the electromotor or its output shaft.

Because the invention is recommended in this context in that the electromotor with its output shaft is mainly arranged transversely to the longitudinal extension of the gear shaft. Thus, the electromotor with its longitudinal extension can be arranged parallel to the level spanned by the output element, so to speak. As a consequence hereof, the electromotor can be moved especially close to the output element. As the output element and the unbolting element are on the same axis as one another in addition and furthermore are arranged directly adjacent to one another on a common axis, the aforementioned compact construction is clarified.

As already explained, the drive unit is generally reverted to its basic position after an unbolting process. The basic position usually corresponds to the bolted position. Thus, the unbolting element is generally in its "bolted" position. For the transition into the unbolted position there is consequently the possibility of transferring the unbolting element both manually and mechanically into this "unbolted" position starting from the "bolted" position.

According to a further advantageous design of the invention the locking mechanism can be equipped with two pawls. The two pawls are on the one hand a latching pawl interacting with the catch and on the other hand an additional securing pawl which regularly prevents opening movements of the pawl. The design is such that the relevant latching pawl and the securing pawl are mechanically disconnected. Thus, the latching pawl can generate a latching moment on the catch. The securing pawl is not mechanically affected hereby. A spring element generally ensures generation of the latching moment on the catch with the aid of the latching pawl. The spring element is assigned to the latching pawl.

In general, work can naturally also take place with a single latching pawl. In any case, the unbolting element usually possesses a pin which meshes into a fork mount on the one pawl or where there are two latching pawls into the fork mount of the securing pawl. The meshing between the pin on the unbolting element and the fork mount of the latching pawl is automatic as soon as the unbolting module is united with the basic module.

Furthermore, the unbolting element is usually equipped with a further pin or activation pins which impinges the latching pawl in the case of realization of a latching pawl and a locking pawl. However, this must be explicitly described as not compulsory.

Hereinafter, the invention is explained in further detail on the basis of a sketch which only depicts an execution example. It shows:

DETAILED DESCRIPTION

Figure 1:
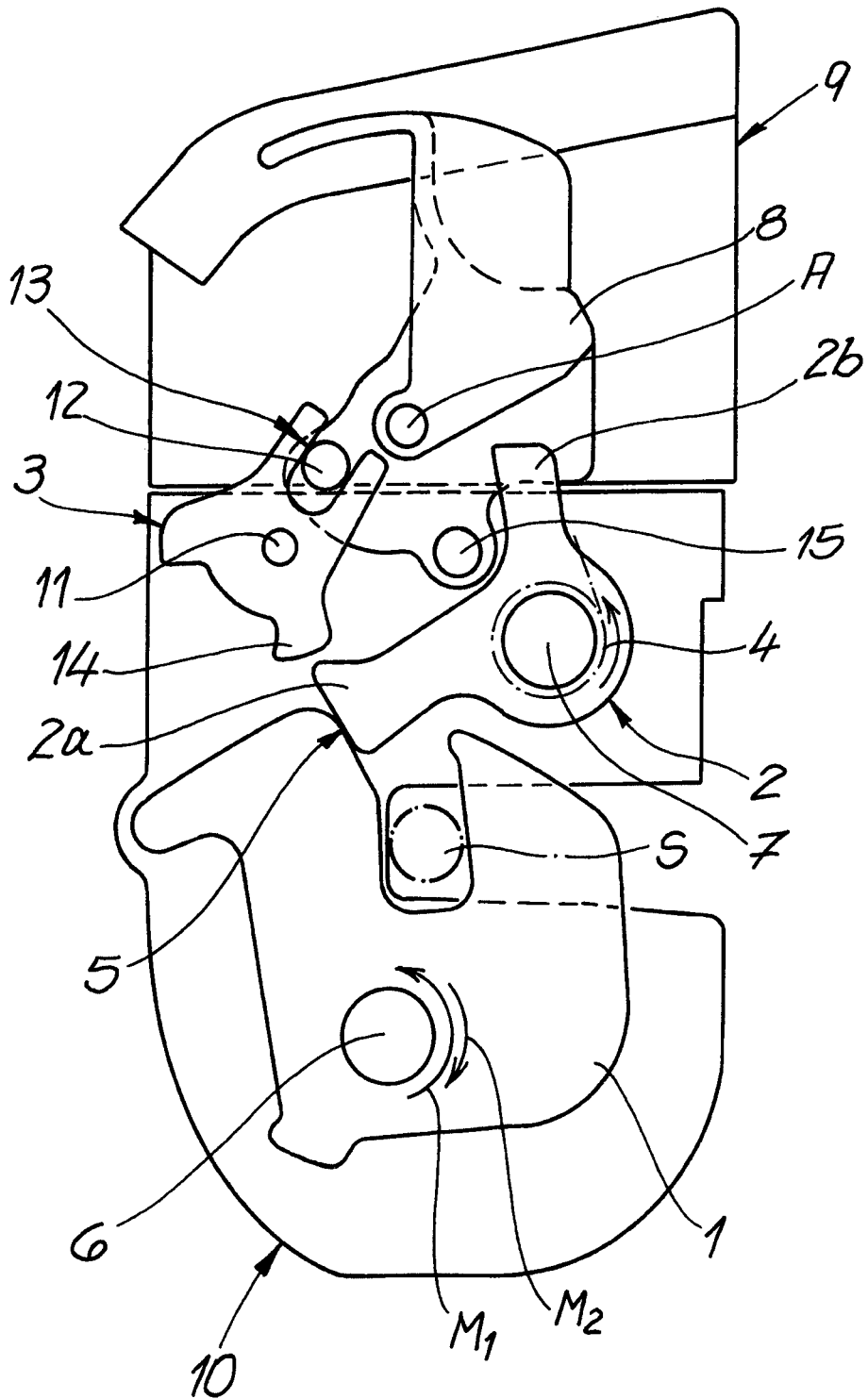
FIG. 1 a latching device in its latched position in accordance with the invention, FIG. 2 the object in accordance with FIG. 1 in an opening process, FIG. 3 the modular construction of the latching device in accordance with FIGS. 1 and 2, depicted on the basis of the latched position, FIG. 4 a variant of the latching device in accordance with FIGS. 1 to 3 with motorized unbolting, FIG. 5 a detail in accordance with FIG. 6 in a top view and FIG. 6 a rear view of sections in accordance with FIG. 4 in different functional positions.
Figure 2:
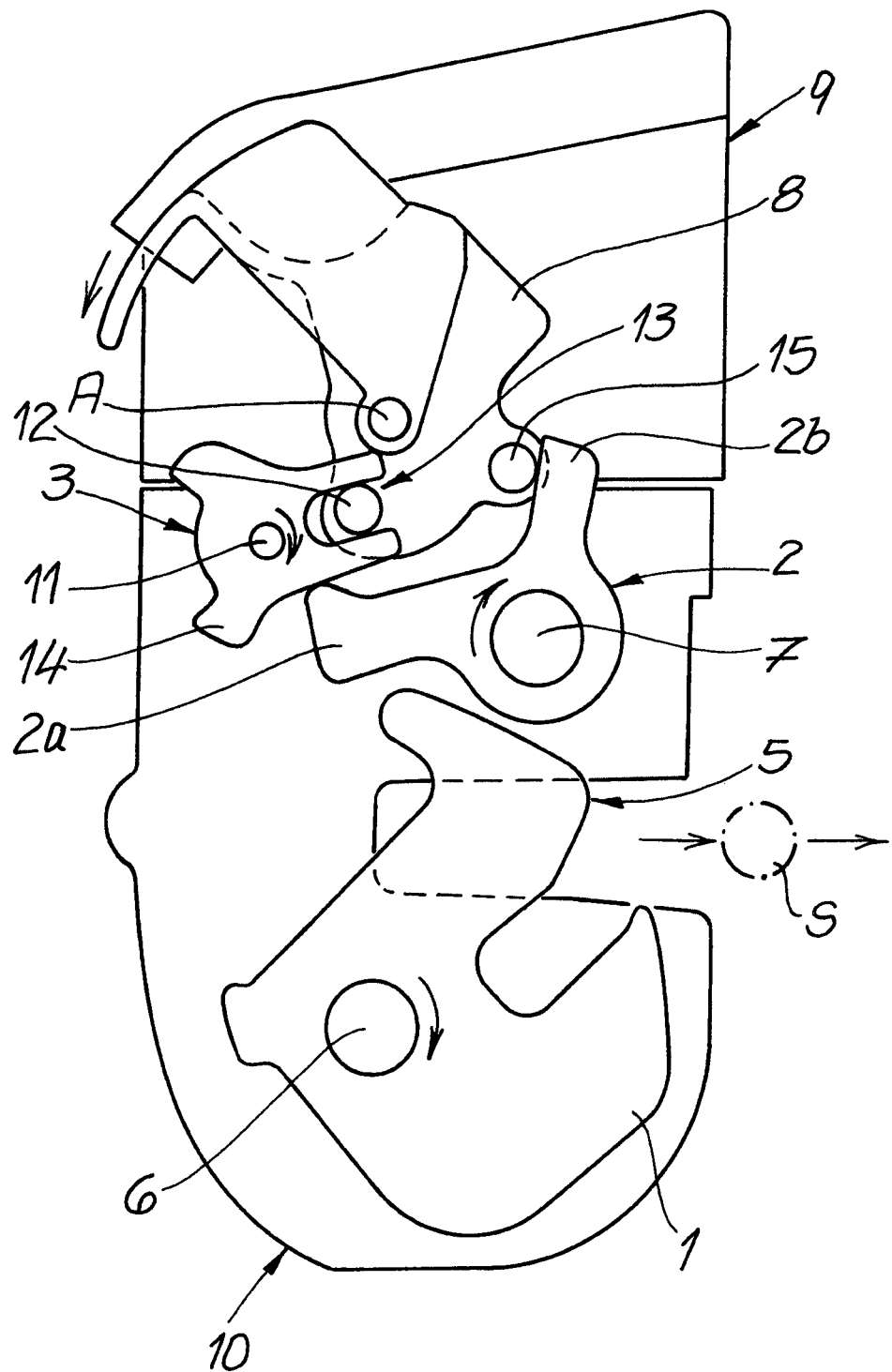
Figure 3:
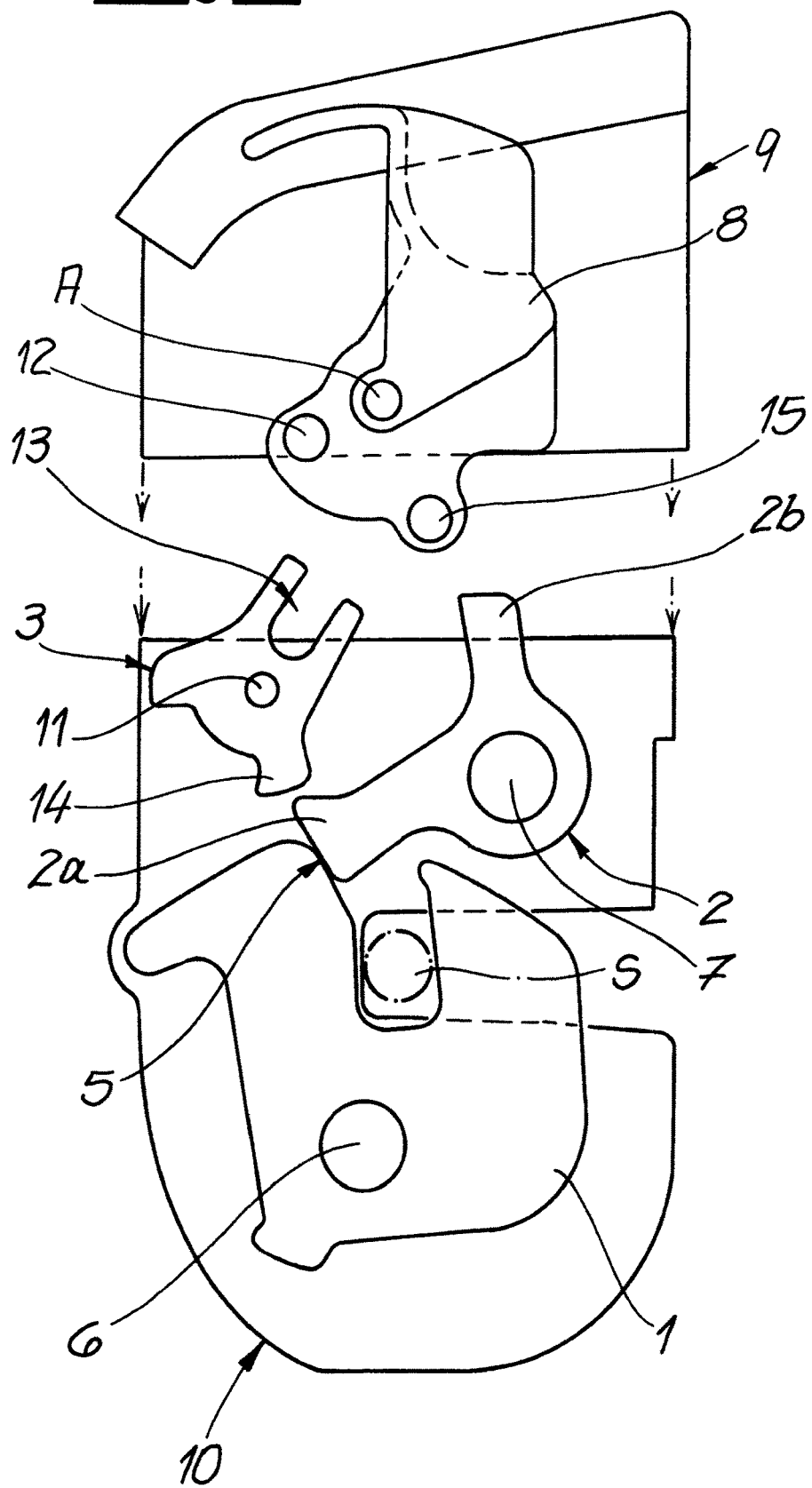

A latching device is shown for automotive applications in the figures. In fact, it is primarily a backrest latch for the bolting and unbolting of seat backrests in motor vehicles. In FIG. 1 which represents the latching position an S locking clip is recognized from the relevant seat backrest merely indicated, which is connected or can be connected to the relevant seat backrest. The backrest latch depicted in the figures is provided for on the chassis side in contrast, i.e. connected to a motor vehicle chassis. In principle, the procedure can also take place vice versa. In this case, the backrest latch of FIG. 1 to FIG. 3 is located on the relevant seat backrest, whereas the locking clip S is connected to the chassis. However, that is not depicted.

With the aid of the backrest latch shown, a seat backrest can be bolted and unbolted in the motor vehicle. In the bolted state, the seat backrest typically assumes an upright position. In actual fact, the seat backrest is usually a rear seat backrest. In contrast, the unbolted position of the backrest or seat backrest generally corresponds to the seat backrest being folded back onto a seat surface. Thus, for example a loading space inside a motor vehicle can be increased.

On the basis of the figures it is recognized that the latching device in accordance with the invention is equipped with a locking mechanism 1, 2, 3. The locking mechanism 1, 2, 3 fundamentally comprises a catch 1 and at least a pawl 2, 3. In the execution example, two pawls 2, 3 are executed, namely a latching pawl 2 and additionally a securing pawl 3, the function and interaction with each other and with the catch 1 of which will be explained in further detail hereafter.

In addition to the locking mechanism 1, 2, 3 at least one spring element 4 is also provided for. During the latching process of the locking mechanism 1, 2, 3 the spring element 4 provides a force on the catch 1 which assists latching, as explained in greater detail hereafter.

In fact, in accordance with the invention the spring element 4 is assigned to the locking pawl or the latching pawl 2. In addition, the spring element 4 impinges the locking pawl or latching pawl 2 in question in such a way that the locking pawl or latching pawl 2 glides along a contact surface 5 of the catch 1 during the latching process of the locking mechanism 1, 2, 3 and hereby generates a latching moment $M_1$. In fact, the locking moment $M_1$ in question in the execution example and not restrictively corresponds to the catch 1 being force impinged in relation to its rotational axis 6 in the direction of an anti-clockwise direction movement, as indicated by the arrow in FIG. 1 equipped with the relevant latching moment $M_1$.

In addition, a further arrow $M_2$ is recognized in FIG. 1 which corresponds to an opening moment $M_2$ on the catch 1. This opening moment $M_2$ results from the catch 1 being pre-tensioned with a spring in the direction of its opened position. The opening direction of the catch 1 corresponds in accordance with the opening moment $M_2$ to a clockwise direction movement compared to the rotational axis 6. Consequently, the opening moment $M_2$ is in the opposite direction to the latching moment $M_1$. Both moments $M_1$ and $M_2$ engage the rotational axis 6 to rotate the catch 1.

In accordance with the invention, the design is now such that the latching moment $M_1$ generated by the locking pawl or latching pawl 2 on the catch 1 exceeds the opening moment $M_2$ in question of the catch 1 which is indicated pictorially in FIG. 1 due to the correspondingly different arrow lengths. The latching moment $M_1$ generated by the pawl 2 on the catch 1 results from the spring element 4 impinging the pawl 2 in an anti-clockwise direction, as indicated by a relevant arrow in FIG. 1.

For a latching movement of the catch 1, starting from its open position which is recognized to some extent in FIG. 2, the locking pawl or latching pawl 2 accomplishes an anti-clockwise movement around its rotational axis 7. This anti-clockwise direction movement of the locking pawl or latching pawl 2 is caused by the spring or the spring element 4 which ensures the pre-tensioning of the locking pawl or latching pawl 2 in an anti-clockwise direction (cf. FIG. 1).

In this process, an activation arm 2a of the locking pawl or latching pawl 2 initially glides along the catch 1 with its lower edge on the contact surface 5. With increasing pivoting of the locking pawl or latching pawl 2 in an anti-clockwise direction around its rotational axis 7 in addition to the edge on the activation arm 2a in question there is also a lower surface in contact with the relevant contact surface 5 of the catch 1. As the contact surface 5 of the catch 1 is inclined overall vis-à-vis the activation arm 2a of the pawl 2 or demonstrates a tangential component with regard to the rotational movement of the catch 1 around its rotational axis 6, this gliding process of the locking pawl or latching pawl 2 ensures that the catch 1 is pivoted in an anti-clockwise direction around the pertaining rotational axis 6 in this latching process.

The latching moment $M_1$ generated by the locking pawl or latching pawl 2 with the aid of the engaging spring or the spring element 4 corresponds to this. As the latching moment $M_1$ is greater than the opening moment $M_2$ on the catch 1, in this process the catch 1 with the aid of the locking pawl or latching pawl 2 so to speak is pushed into its absolutely attainable end position by the force of the spring or the spring element 4. In addition to the stop arm 2a the pawl 2 also demonstrates an activation arm 2b which is viewed hereinafter.

As already explained, the depicted locking mechanism 1, 2, 3 is equipped with two locking pawls 2, 3 which is not compulsory, however. I.e. the second locking pawl or securing pawl 3 ultimately represents an option and is dispensable in principle for the basic functioning.

Nevertheless, the securing pawl 3 in the latching position represented in FIG. 1 ensures that the locking pawl or latching pawl 2 cannot accomplish an unintentional opening movement which corresponds to a pivoting of the locking pawl or latching pawl 2 in a clockwise direction around its rotational axis 7. Because such opening movements in the clockwise direction around the rotational axis 7 are prevented or blocked by the securing pawl 3, against which the activation arm 2a of the locking pawl or latching pawl 2 travels or stops in this process. Such opening movements on the relevant latching pawl 2 for example in the event of an accident can be caused by engaging inertia forces and in accordance with the invention do not lead to the depicted latching device or the backrest latch being unintentionally opened in the execution example.

In addition, an unbolting element 8 is recognized which gives rise to an opening of the locking mechanism 1, 2, 3 or a locking mechanism opening. The unbolting element 8 can be manually and/or mechanically impinged, as depicted in the opening process in FIG. 2.

The unbolting element 8 is itself part of an exchangeable unbolting module 9 which is especially to be recognized in FIG. 3. In fact, a latch casing 9, 10 of the depicted and described backrest latch consists on the one hand of the already stated unbolting module 9 and a basic module 10 on the other hand. The basic module 10 incorporates the locking mechanism 1, 2, 3 and ensures its accommodation. In contrast, the unbolting module 9 is primarily equipped with the unbolting element 8. The unbolting element 8 is recognized in FIG. 3. This can be designed as a simple, manually impingeable lever or also as an unbolting drive with an electromotor not depicted in FIG. 3. Additionally, remote control is possible so to speak with the aid of a Bowden cable which is manually impinged by a pull strap or a lever. In addition, a remotely controlled motorized impingement of the unbolting element 8 is naturally also conceivable.

Due to the modular construction of the latch casing 9, 10 in accordance with the invention the pertaining backrest latch can be adapted to practically any conceivable installation situation or also the planned activation wish. To this end, it is only necessary to unite the relevantly designed unbolting module 9 with the basic module 10 so to speak to be retained for all versions to the latch casing 9, 10. To this end, both modules 9, 10 can, for example, be connected by means of a detachable plug connection, screw connection, etc.

The circumstance that the latching pawl 2 and the securing pawl 3 are mechanically disconnected from one another is also of special importance for the invention. This is recognized in particular with a comparative observation of FIGS. 1 and 2. In accordance with this, in the latching position in accordance with FIG. 1 a gap is present between the securing pawl 3 and the latching pawl 2. Thus, in particular the latching pawl 2 can ensure, unaffected by the securing pawl 3, the desired generation of the latching moment $M_1$ on the contact surface 5 of the catch 1.

The securing pawl 3 generally assumes its resting position depicted in FIG. 1 assisted by the spring. In this resting position, the securing pawl 3 ensures that the latching pawl 2 is blocked in its opening direction associated with a pivoting movement in a clockwise direction around its axis 7. Because during such a pivoting movement in the clockwise direction the activation arm 2a of the latching pawl 2 travels against the securing pawl 3.

In order to now open the locking mechanism 1, 2, 3 starting from the latching position in accordance with FIG. 1, the securing pawl 3 is initially transferred into a position releasing the latching pawl 2. The invention attains this within the scope of the execution example in accordance with FIG. 2 by the unbolting element 8 in the depiction in accordance with FIG. 2 being pivoted in relation to its axis or rotational axis A in an anti-clockwise direction as indicated. As stated, this can occur manually and/or mechanically, with or without remote control. The anti-clockwise direction movement of the unbolting element 8 around its axis A now means that the securing pawl 3 is pivoted around its axis or rotational axis 11 within the scope of the depiction in accordance with FIG. 2 in a clockwise direction. In fact, a pin 12 on the unbolting element 8 ensures this which engages into a fork mount 13 of the securing pawl 3. The associated clockwise direction movement of the securing pawl 3 ensures that a securing nose 14 blocking the latching pawl 2 where necessary in relation to the latching pawl 2 or its stop arm 2a is pivoted away. As a consequence hereof, the latching pawl 2 is released from the securing pawl 3.

If the unbolting element 8 is not further impinged around its rotational axis A in an anti-clockwise direction, a further pin or activation pin 15 of the unbolting element 8 comes into contact with the aforementioned activation arm 2b of the locking pawl 2. As a consequence hereof, the locking pawl or latching pawl 2 is pivoted around its rotational axis 7 in a clockwise direction as indicated by the arrow in FIG. 2.

The clockwise direction movement of the locking pawl or latching pawl 2 in relation to its rotational axis 7 now ensures that the activation arm 2a of the locking pawl or latching pawl 2 is released and removed from the contact surface 5 of the catch 1. To this end, the unbolting element 8 must overcome the latching moment $M_1$ or the forces exerted by the spring 4 on the latching pawl 2 in the opposite direction, which is easily possible by means of a lever translation or the drive which may be envisaged here. Thus, at the end of the opening process in accordance with FIG. 2 the catch 1 can pivot in a spring-assisted manner and following the opening moment $M_2$ in a clockwise direction and releases the locking clip S. Now the pertaining backrest is unbolted.

Figure 4:
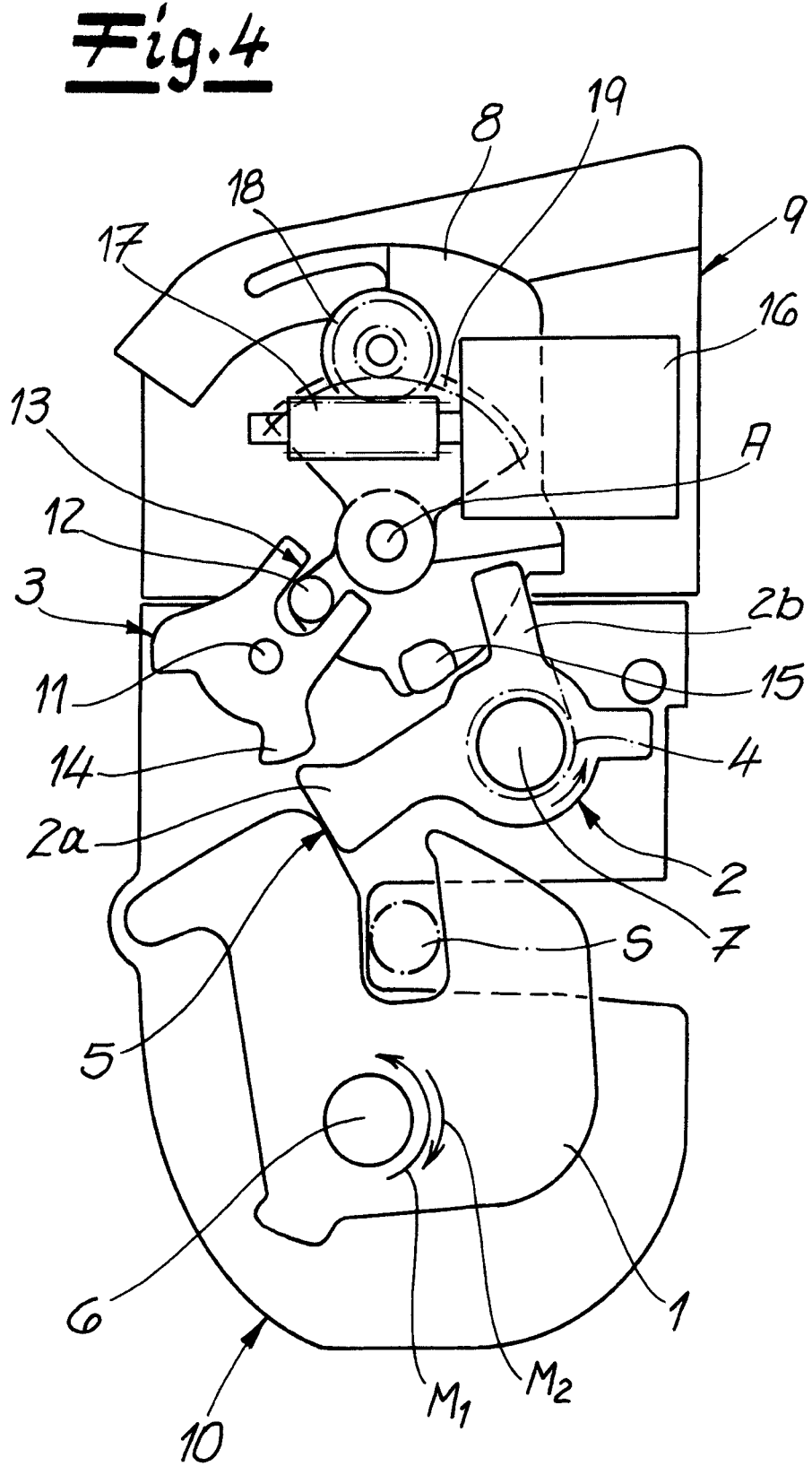
Figure 5:
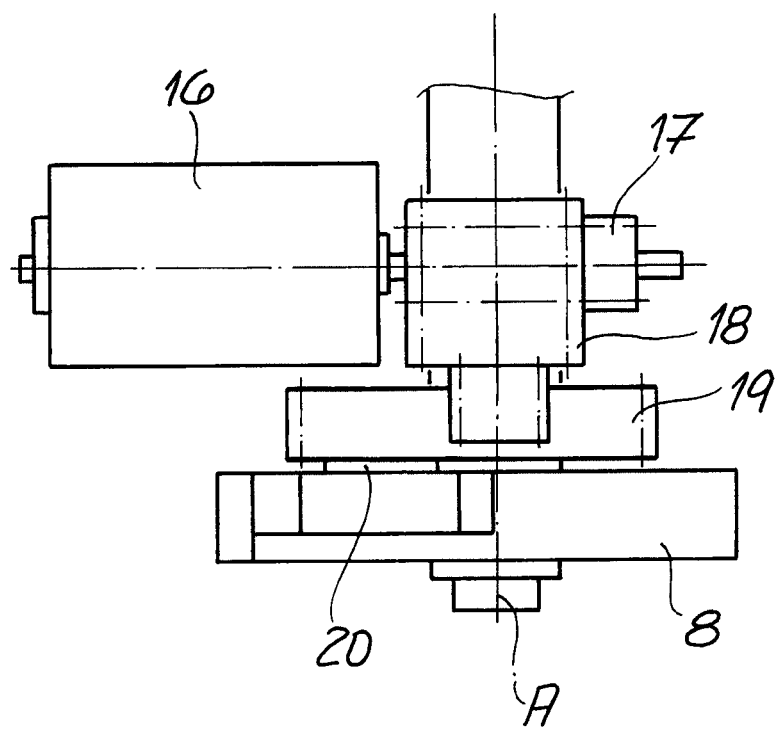
Figure 6:
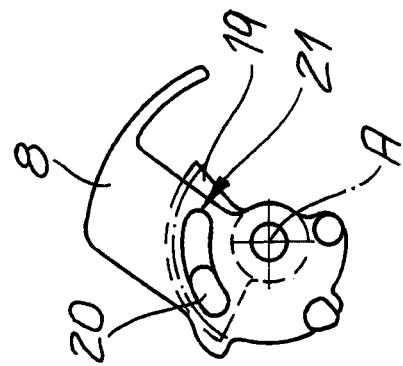
Figure 6:
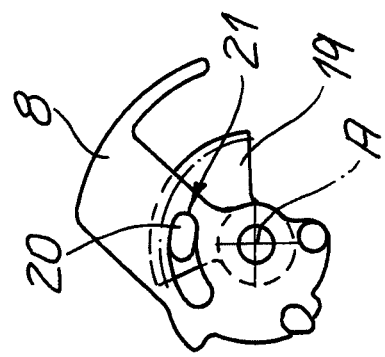
Figure 6:
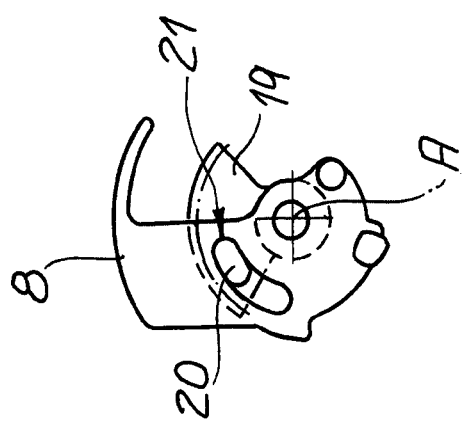

FIGS. 4 to 6 depicts a latching device which is comparable to that already described. In contrast to the variant in accordance with FIGS. 1 to 3 the version according to FIGS. 4 to 6 works mechanically. This means that the unbolting element 8 is not impinged for example with the aid of a Bowden cable engaged on the unbolting element 8 in order to effect the already described rotation around the axis or rotational axis A in an anti-clockwise direction in the transition from the "bolted" position to the "unbolted" position. Instead, the variant works in accordance with FIGS. 4 to 6 with a motorized drive unit 16, 17, 18, 19. On the basis of a comparable view of FIGS. 4 and 5 it is recognized that the motorized drive unit 16, 17, 18, 19 demonstrates an electromotor 16 with an output shaft 17. The output shaft 17 has an external screw contour. With the aid of the screw contour the output shaft 17 engages into a gear shaft 18. The gear shaft 18 itself combs with an interlinking of an output element 19.

In addition to the motorized drive unit 16, 17, 18, 19 the thus executed unbolting module 9 is recognized again. In fact, the manual or manually operating unbolting module 9 within the scope of the variant in accordance with FIGS. 1 to 3 is characterized by the relevant unbolting module 9 largely only incorporating the unbolting element 8 in its interior. In fact, the unbolting element 8 is pivotably located around its axis A in the unbolting module 9 in question. A Bowden cable engaging, for example, on the end side of the unbolting element 8 may now ensure that the unbolting element 8 accomplishes the anti-clockwise direction movement recognizable during the transition from FIG. 1 to FIG. 2 to assume the unbolted position.

For the unbolting module 9 within the scope of the variant in accordance with FIGS. 4 to 6 in contrast this is a motorized unbolting module 9, which not only incorporates the unbolting element 8 pivotably located around its axis A in the unbolting module 9 once again, but also the previously described motorized drive unit 16, 17, 18, 19. This is arranged in the view in accordance with FIG. 5 "behind" the unbolting element 8 arranged on the front side "in front". In detail, the output element 19 possesses a cam 20, which interacts with a stop 21 on the unbolting element 8. The output element 19 and the unbolting element 8 are located on the same axis on the common axis A. The output element 19 is a circular segment-type disc which is equipped on its segmental arch with an interlocking to engage the gear shaft 18. Thus, the gear shaft 18 with its external interlocking can engage into the relevant interlocking of the output element 19 on the circular arch and pivot the output element 19, as recognized in the individual functional positions within the scope of FIG. 6.

In fact, the transition of the unbolting element 8 from its "bolted" to its "unbolted" position is depicted in FIG. 6. To this end, it is only necessary for the electromotor 16 to shift the output element 19 so far in rotations that the cam 20 located on the output element 19 and generally protruding vertically travels until it meets the stop 21 on the unbolting element 8. As soon as this is the case, further movements of the output element 19 lead to the output element 19 taking with it the unbolting element 8 located on the same axis in its further pivoting movement. Thus, the unbolting element 8 is automatically transferred from its "bolted" position to its "unbolted" position. This unbolted state is attained in the right image in FIG. 6, whereas the left image in FIG. 6 shows the "bolted" starting state.

The impingement of the electromotor 16 individually leads to its output shaft 17 rotating with the worm gear located thereon. This worm gear or the output shaft 17 engages on the underside of the gear shaft 18, consequently the electromotor 16 so to speak can be placed in an intermediate space between the output element 19 and the base or floor of the unbolting module 9. This promotes a compact and narrow construction. At the same time, this is possible because the gear shaft 18 and the output shaft 19 are respectively pivotable around parallel axes which also demonstrate a distance from one another. On the basis of FIG. 5 it is recognized that the axis of the gear shaft 18 and consequently the gear shaft 18 is arranged as such above the axis of the output element 19. Thus, the electromotor 16 with its output shaft 17 can largely be arranged transversely to the longitudinal extension of the gear shaft 18. Furthermore, the electromotor 16 is aligned with its output shaft 17 in its longitudinal extension practically parallel to the level spanned by the output element 19.

As soon as the electromotor 16 has transferred the output element 19 or the cam 20 from the bolted into the unbolted position in accordance with FIG. 6, the entire motorized drive unit 16, 17, 18 is returned to its basic position in accordance with the left image in FIG. 6. This basic position corresponds to the "bolted" position. Thus, the locking mechanism 1, 2, 3 is located directly in its bolted position, as soon as a seat backrest equipped with the relevant backrest latch is transferred to its upright position. Starting from this upright position, the backrest latch can now be unbolted both manually and mechanically.

The invention claimed is:

1. A latching device for bolting and unbolting seat backrests in motor vehicles, the latching device comprising:
   a latch casing that includes a basic module and an exchangeable unbolting module;
   the basic module including a locking mechanism having a catch, and at least one pawl;
   the exchangeable unbolting module being detachably connectable to the basic module and including a manually and/or mechanically impingeable unbolting element;
   wherein, when the unbolting module and the basic module are in a connected state, the at least one pawl of the basic module contacts the unbolting module,
   wherein the at least one pawl comprises a latching pawl and a securing pawl that are mechanically disconnected, wherein a gap is present between the latching pawl and the securing pawl when the latching device is in the latching position.

2. The latching device in accordance with claim 1, wherein the unbolting module and the basic module are detachably connectable by a detachable plug connection or a screw connection.

3. The latching device in accordance with claim 1, wherein the unbolting module is connectable to the basic module on a head side of the basic module.

4. The latching device in accordance with claim 1, further comprising a drive unit for the mechanically impingeable unbolting element, with the drive unit including at least one electromotor and an output element interacting with the unbolting element.

5. The latching device in accordance with claim 4, wherein the output element includes a cam impinging the unbolting element.

6. The latching device in accordance with claim 4, wherein the drive unit includes a gear shaft engageable by an output shaft of the electromotor.

7. The latching device in accordance with claim 6, wherein the gear shaft is engageable with the output shaft of the electromotor and the output element of the drive unit, the gear shaft being formed as a double gear shaft.

8. The latching device in accordance with claim 6, wherein the gear shaft and the output element are pivotable around parallel axes.

9. The latching device in accordance with claim 6, wherein the electromotor and an output shaft of the electromotor is mainly arranged transversely to a longitudinal extension of the gear shaft.

10. The latching device in accordance with claim 4, wherein the drive unit is returnable to a basic position after an unbolting process of the latching device.

11. The latching device in accordance with claim 1, wherein the latch casing includes a first casing that houses the basic module and a second casing that houses the unbolting module, the latch casing being modular.

12. The latching device in accordance with claim 1, wherein the manually and/or mechanically impingeable unbolting element is motorized.

13. A latching device for bolting and unbolting seat backrests in motor vehicles, the latching device comprising:
   a latch casing that includes a basic module and an exchangeable unbolting module;
   the basic module including a locking mechanism having a catch, and at least one pawl;
   the exchangeable unbolting module being detachably connectable to the basic module and including a manually and/or mechanically impingeable unbolting element;

wherein, when the unbolting module and the basic module are in a connected state, the at least one pawl of the basic module contacts the unbolting module, and wherein the latching device includes a drive unit for the manually and/or mechanically impingeable unbolting element, with the drive unit including at least one electromotor and an output element interacting with the unbolting element, wherein the drive unit includes a gear shaft engageable by an output shaft of the at least one electromotor.

\* \* \* \* \*